(12) United States Patent
Oh et al.

(10) Patent No.: US 12,736,839 B2
(45) Date of Patent: Sep. 15, 2026

(54) DISPLAY DEVICE

(71) Applicant: LG Display Co., Ltd., Seoul (KR)

(72) Inventors: Youngmin Oh, Yeosu-si (KR); Jong Hoon Woo, Paju-si (KR); Seong-Il Kim, Seoul (KR); YoonJung Eo, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/984,945

(22) Filed: Nov. 10, 2022

(65) Prior Publication Data

US 2023/0213797 A1 Jul. 6, 2023

(30) Foreign Application Priority Data

Dec. 31, 2021 (KR) ........................ 10-2021-0194691

(51) Int. Cl.

*G02F 1/13* (2006.01)
*G02F 1/1335* (2006.01)
*G02F 1/1337* (2006.01)
*G02F 1/1347* (2006.01)
*G02F 1/139* (2006.01)

(52) U.S. Cl.

CPC ...... *G02F 1/1323* (2013.01); *G02F 1/133531* (2021.01); *G02F 1/1347* (2013.01); *G02F 1/1393* (2013.01); *G02F 1/133742* (2021.01); *G02F 2202/04* (2013.01)

(58) Field of Classification Search

CPC ..... G02F 1/1323; G02F 1/1347; G02F 1/1393
See application file for complete search history.

(56) References Cited

U.S. PATENT DOCUMENTS

2009/0153783 A1* 6/2009 Umemoto .............. G02B 27/28 359/487.01
2010/0245299 A1* 9/2010 Han .................... G02F 1/13452 345/204
2014/0239317 A1* 8/2014 Bang ...................... H05K 1/147 438/28
2015/0268478 A1* 9/2015 Kim ...................... G02F 1/1347 349/15
2017/0293167 A1* 10/2017 Shen ..................... G02F 1/1333
2021/0349335 A1* 11/2021 Chen ..................... G02F 1/1323
2023/0035147 A1* 2/2023 Hoshino .............. G02B 5/3016

FOREIGN PATENT DOCUMENTS

CN 110780477 A 2/2020

* cited by examiner

*Primary Examiner* — Alexander P Gross
(74) *Attorney, Agent, or Firm* — Birch, Stewart, Kolasch & Birch, LLP

(57) ABSTRACT

A display device for switching a viewing angle, can include a display panel, a polarizing plate disposed on the display panel, a light path control cell disposed on the polarizing plate and including a liquid crystal layer, and a light path conversion film disposed on the light path control cell and including a plurality of molecules including a polarization alignment dye. An absorption axis of the polarizing plate can be substantially perpendicular to an absorption axis of the light path conversion film. The display device can switch to a shared mode or a shielding mode depending on whether or not a voltage is applied to the light path control cell, thereby providing the display device that switches its viewing angle effectively.

8 Claims, 11 Drawing Sheets

< Shared Mode >

| Angle of Polarization Alignment Dye | 45° | 75° | 90° |
|---|---|---|---|
| Shared Mode | Passenger's Position<br>Driver's Position | Passenger's Position<br>Driver's Position | Passenger's Position<br>Driver's Position |
| Shielding Mode | Passenger's Position<br>Driver's Position | Passenger's Position<br>Driver's Position | Passenger's Position<br>Driver's Position |

DISPLAY DEVICE

CROSS-REFERENCE TO RELATED APPLICATION

This application claims the priority of under 35 U.S.C. § 119(a) to Korean Patent Application No. 10-2021-0194691, filed in the Republic of Korea on Dec. 31, 2021, the entire contents of which are hereby expressly incorporated by reference into the present application.

BACKGROUND

Technical Field

Embodiments of the present disclosure relate to a display device, and more particularly, a display device switching a viewing angle.

Discussion of the Related Art

In general, a display device is widely used as a display screen for a variety of electronic products including portable electronic devices such as a mobile communication terminal, a personal digital assistant (PDA), an e-book, a portable multimedia player (PMP), a navigation system, an ultra-mobile PC (UMPC), a mobile phone, a smart phone, a tablet personal computer (PC), a watch phone and various products such as a TV, a laptop computer, a monitor, an automatic teller machine (ATM) for banking.

The viewing angle characteristics of such display devices are given much focus in order to provide a good viewing experience to users.

In this aspect, the display device should be able to realize image quality that is clear and not distorted even in a wide viewing angle range. Accordingly, a wide viewing angle technology is continuously being developed.

However, in a situation when a user does not desire that any information displayed on a screen of the user's display device is viewed by others nearby, the user can utilize a narrow viewing angle mode or a shielding mode, which enables only the person sitting in front of the screen to view the image being displayed on the screen. In other situations when the user does not mind others nearby to view the information being displayed on the display device, the user can operate the display devices in a wide viewing angle mode or a shared mode.

SUMMARY OF THE DISCLOSURE

Embodiments of the present disclosure relate to a display device that can switch to a shared mode or a shielding mode depending on whether or not a voltage is applied to a light path control cell of the display device.

Embodiments of the present disclosure relate to a display device that is viewed from both a driver's position and a passenger's position in a shared mode.

Embodiments of the present disclosure relate to a display device in which a screen located in front of the passenger is not visible to the driver but is visible only to the passenger in the shielding mode.

According to embodiments of the present disclosure, there can be provided a display device including a polarizing plate disposed on a display panel, a light path control cell disposed on the polarizing plate and including a liquid crystal layer, and a light path conversion film disposed on the light path control cell and including a plurality of molecules including a plurality of polarization alignment dyes, wherein an absorption axis of the polarizing plate is substantially perpendicular to an absorption axis of the light path conversion film, and the display device can switch to a shared mode or a shielding mode depending on whether or not a voltage is applied to the light path control cell.

According to embodiments of the present disclosure, there can be provided a display device including a display panel connected to at least one printed circuit, a polarizing plate disposed on the display panel, a light path control cell that is disposed on the polarizing plate, electrically connected to the printed circuit, and includes a liquid crystal layer, and a light path conversion film disposed on the light path control cell and including a plurality of the molecules including a plurality of the polarization alignment dyes, wherein an absorption axis of the polarizing plate is substantially perpendicular to an absorption axis of the light path conversion film, and the plurality of the molecules including the plurality of the polarization alignment dyes are tilted with respect to a surface of the polarizing plate.

BRIEF DESCRIPTION OF DRAWINGS

The above and other objects, features, and advantages of the present disclosure will be more clearly understood from the following detailed description, taken in conjunction with the accompanying drawings, in which.

DETAILED DESCRIPTION OF THE EMBODIMENTS

Figure 1:
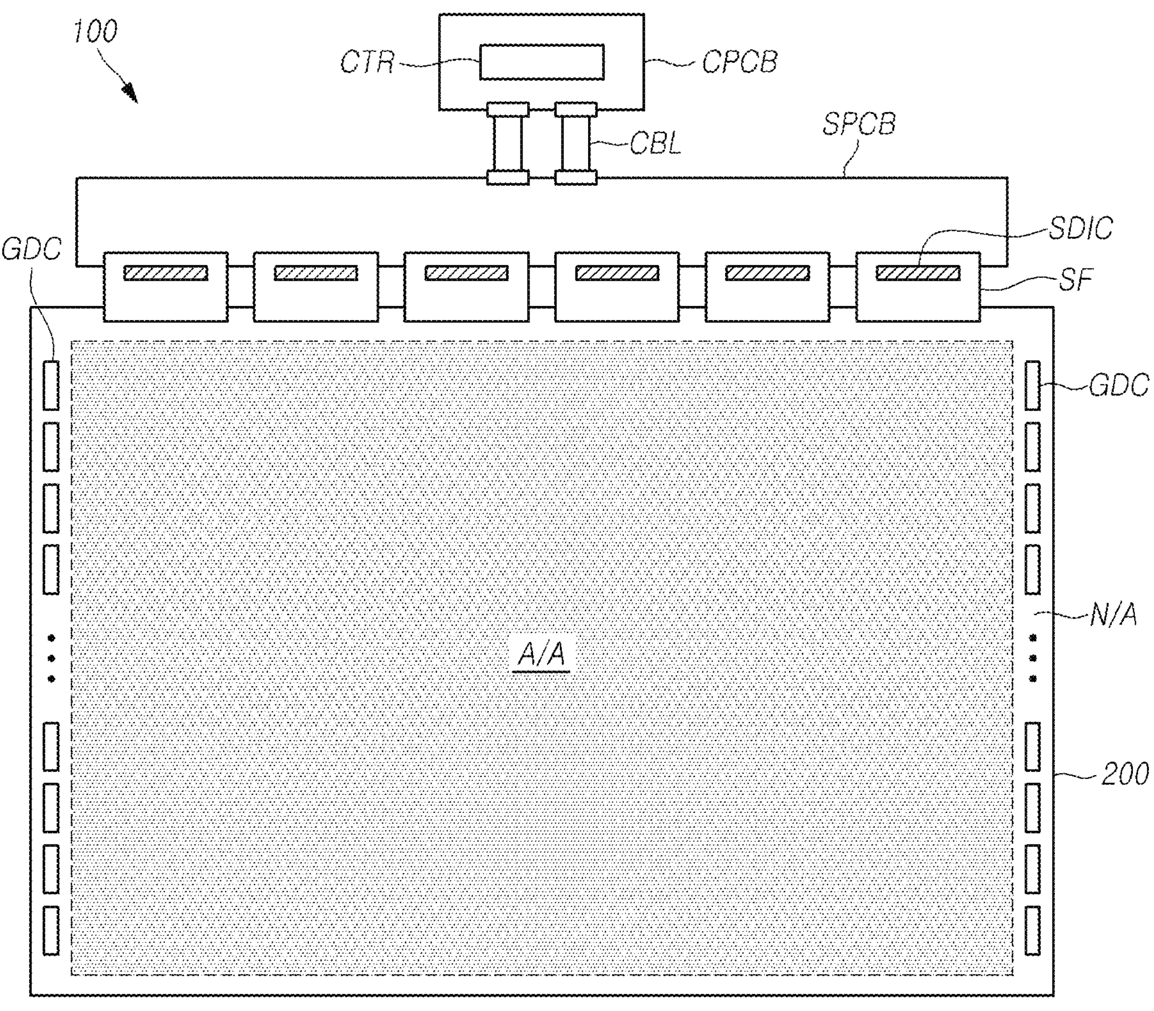
FIG. 1 is an exemplary view of the implementation of a system of a display device according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description can make the subject matter in some embodiments of the present invention rather unclear. Terms such as "including," "having," "containing," "constituting," "make up of," and "formed of" used herein are generally intended to allow other components to be added unless the terms are used with the term "only." As used herein, singular forms are intended to include plural forms unless the context clearly indicates otherwise.

Terms such as "first," "second," "A," "B," "(A)," or "(B)" can be used herein to describe elements of the present disclosure. Each of these terms is not used to define essence, order, sequence, or the number of elements, etc., but is used merely to distinguish the corresponding element from other elements.

When it is mentioned that a first element "is connected or coupled to," "contacts or overlaps," etc. a second element, it should be interpreted that, not only can the first element "be directly connected or coupled to" or "directly contact or overlap" the second element, but a third element can also be "interposed" between the first and second elements, or the first and second elements can "be connected or coupled to," "contact or overlap," etc. each other via a fourth element. Here, the second element can be included in at least one of two or more elements that "are connected or coupled to," "contact or overlap," etc. each other.

When time-related terms, such as "after," "subsequent to," "next," "before," and the like, are used to describe processes or operations of elements or configurations, or flows or steps in operations, processes, manufacturing methods, these terms can be used to describe non-consecutive or non-sequential processes or operations unless the term "directly" or "immediately" is used together.

In addition, when any dimensions, relative sizes, etc. are mentioned, it should be considered that numerical values for elements or features, or corresponding information (e.g., level, range, etc.) include a tolerance or error range that can be caused by various factors (e.g., process factors, internal or external impact, noise, etc.) even when a related description is not specified. Further, the term "may" fully encompasses all the meanings of the term "can."

Hereinafter, various embodiments of the present disclosure will be described in detail with reference to the accompanying drawings. All the components of each display device according to all embodiments of the present disclosure are operatively coupled and configured.

FIG. 1 is an exemplary view of the implementation of a system of a display device according to embodiments of the present disclosure.

Referring to FIG. 1, in the display device according to embodiments of the present disclosure, a data driver SDIC can be implemented in a Chip On Film (COF) type among various types such as TAB, COG, and COF, and a gate driver GDC can be implemented in a Gate In Panel (GIP) type among various types such as TAB, COG, COF, and GIP.

The data driver SDIC can be implemented with one or more source driver integrated circuits SDIC. FIG. 1 is an exemplary view of the data driver SDIC implemented with a plurality of the source driver integrated circuits SDIC.

When the data driver SDIC is implemented in the COF type, each source driver integrated circuit SDIC implementing the data driver SDIC can be mounted on a source-side circuit film SF.

One side of the source-side circuit film SF can be electrically connected to a pad portion or a collection of pads existing in a non-active area N/A of a display panel 200.

Wires for electrically connecting the source driver integrated circuit SDIC and the display panel 200 can be disposed on the source-side circuit film SF.

The display device can include one or more source printed circuit boards SPCB for circuit connection between the plurality of the source driver integrated circuits SDIC and other devices and a control printed circuit board CPCB for mounting control parts and various electrical devices.

The other side of the source-side circuit film SF on which the source driver integrated circuit SDIC is mounted can be connected to one or more source printed circuit boards SPCB.

For example, one side of the source-side circuit film SF on which the source driver integrated circuits SDIC is mounted can be electrically connected to the non-active area N/A of the display panel 200, and the other side thereof can be electrically connected to the source printed circuit board SPCB.

A controller CTR for controlling the operation of the data driver SDIC, the gate driver GDC, etc. can be disposed in the control printed circuit board CPCB.

In addition, a power management integrated circuit PMIC, etc. that supplies various voltages or currents to the display panel 200, the data driver SDIC, the gate driver GDC, etc. or controls the various voltages or currents to be supplied can be further disposed in the control printed circuit board CPCB.

The source printed circuit board SPCB and the control printed circuit board CPCB can be connected through at least one connecting member CBL. For example, the connecting member CBL can be a flexible printed circuit FPC, a flexible flat cable FFC, etc.

One or more source printed circuit boards SPCB and control printed circuit boards CPCB can be implemented by being integrated into one printed circuit board.

When the gate driver GDC is implemented in a Gate In Panel (GIP) type, a plurality of gate driving circuits GDC included in the gate driver GDC can be formed directly on the non-active area N/A of the display panel 200.

Each of the plurality of the gate driving circuits GDC can output a corresponding scan signal to a corresponding gate line disposed in an active area A/A of the display panel 200. Here, the active area A/A can mean an area from which light is emitted, for example, an area where an image is displayed.

The plurality of the gate driving circuits GDC disposed on the display panel 200 can receive various signals such as a clock signal, a high level gate voltage, a low level gate voltage, a start signal, and a reset signal necessary to generate the scan signal through wirings associated with driving a gate in the non-active area N/A.

The wirings associated with driving the gate in the non-active area N/A can be electrically connected to the source-side circuit film SF disposed closest to the plurality of the gate driving circuits GDC.

The display panel 200 can be a liquid crystal display panel or an organic light emitting display panel, but the type of the display panel of the present disclosure is not limited thereto. If a display panel displays an image, it is sufficient.

A display device 100 according to embodiments of the present disclosure can be applied to a display for vehicles such as a car. For example, a shielding mode or a drive mode and a shared mode or a non-drive mode can be implemented through a polarizing plate, a light path control cell, and a light path conversion film disposed on the display panel.

For example, when the display device 100 according to embodiments of the present disclosure is the display for vehicles and is positioned in a direction in which a passenger looks at it from the front, the image of the display device 100 can be viewed only by the passenger when the display device is in the shielding mode, and it can be viewed not only by the passenger but also by a driver when the display device is in the shared mode. This will be reviewed as below with reference to the drawings. However, other examples are possible such as only the driver can view the image in the shielding more while both the driver and the passenger can view the image in the shared mode. Other variations are possible, e.g., the viewing of the image can be restricted selectively amongst all viewers present in the vehicle or in a viewing environment.

Figure 2:
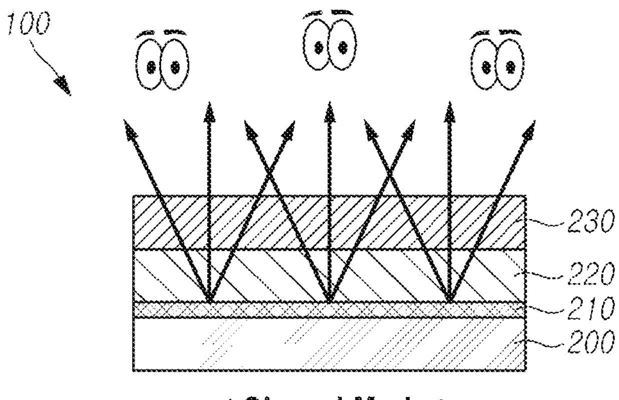
FIG. 2 is a schematic view of the display device in a shared mode according to embodiments of the present disclosure.
Figure 3:
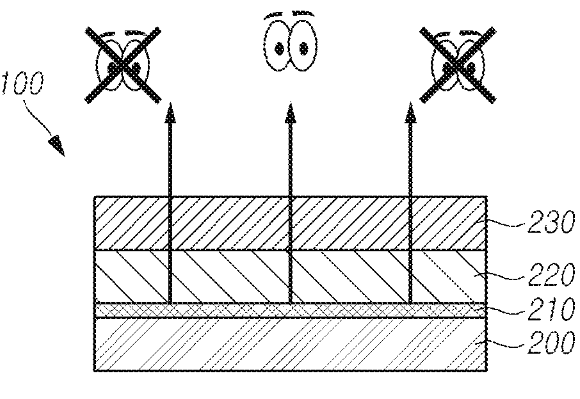
FIG. 3 is a schematic view of the display device in a shielding mode according to embodiments of the present disclosure.

FIG. 2 is a schematic view of a display device in a shared mode according to embodiments of the present disclosure. FIG. 3 is a schematic view of the display device in a shielding mode according to embodiments of the present disclosure.

Referring to FIGS. 2 and 3, the display device 100 according to embodiments of the present disclosure can include a display panel 200, a polarizing plate 210, a light path control cell 220, and a light path conversion film 230.

To be specific, the polarizing plate 210 can be disposed on the display panel 200 of the display device 100 according to embodiments of the present disclosure, the light path control cell 220 including a liquid crystal layer can be disposed on the polarizing plate 210, and the light path conversion film 230 can be disposed on the light path control cell 220.

When the display device 100 is in the shared mode, light emitted from the display panel 200 can sequentially pass through the polarizing plate 210, the light path control cell 220, and the light path conversion film 230 to be viewed by a driver and a passenger.

As shown in FIG. 2, when the display device 100 is in the shared mode, no voltage can be applied to the light path control cell 220. The light path control cell 220 can include the liquid crystal layer, and a liquid crystal mode of the light path control cell 220 can be an electrically controlled birefringence (ECB) mode.

When the display device 100 is in the shared mode, the light emitted from the display panel 200 can be diffused in various directions while passing through the light path control cell 220 and the light path conversion film 230 so that viewers looking at the display panel 200 (e.g., the driver and the passenger) can view an image from various directions.

As a result, when the driver uses functions such as parking, the driver can easily view the image on the display panel 200 disposed in front of the passenger.

As illustrated in FIG. 3, when the display device 100 is in the shielding mode, the voltage can be applied to the light path control cell 220.

When the display device 100 is in the shielding mode, the light emitted from the display panel 200 can be emitted in a front direction of the display panel 200 while passing through the light path control cell 220 and the light path conversion film 230. As a result, since the image can be viewed only in the front direction of the display panel 200, the passenger can view the image on the display panel 200, but it can be difficult for the driver to view the image.

Accordingly, even if the display panel 200 disposed in front of the passenger is driven, driving safety can be secured since it may not be viewed by the driver.

The liquid crystal mode of the light path control cell 220 being the ECB mode has been mainly described for FIGS. 2 and 3, but embodiments of the present disclosure are not limited thereto.

For example, the liquid crystal mode of the light path control cell 220 can be a vertical alignment (VA) mode. In this case, the display device 100 can be in the shared mode when the voltage is applied to the light path control cell 220, and can be in the shielding mode when no voltage is applied thereto.

In the following description, for convenience of description, the liquid crystal mode of the light path control cell 220 being the ECB mode will be mainly described.

A stacked structure of the display device 100 according to the embodiments of the present disclosure will be reviewed as follows.

Figure 4:
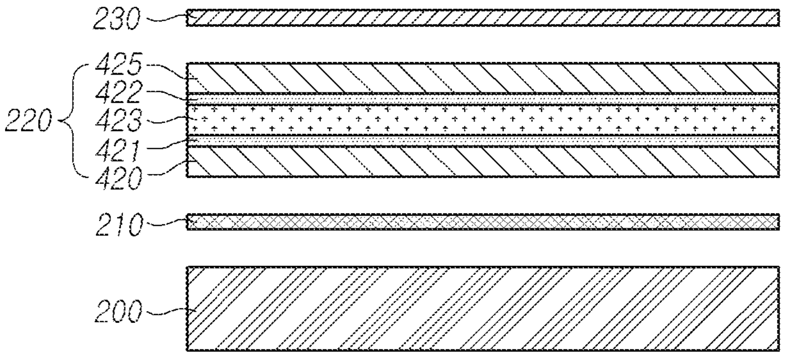
FIG. 4 is a view of a stacked structure of the display device according to embodiments of the present disclosure.
Figure 5:
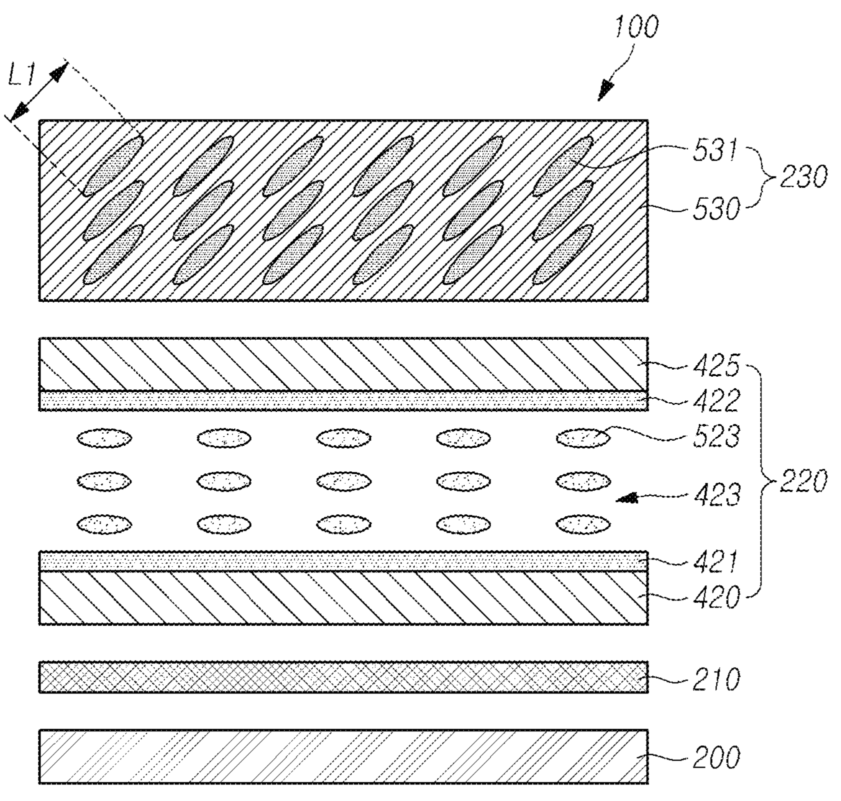
FIG. 5 is a schematic view of a cross-sectional structure of the display device according to embodiments of the present disclosure.

FIG. 4 is a view of a stacked structure of a display device according to embodiments of the present disclosure. FIG. 5 is a schematic view of a cross-sectional structure of the display device according to embodiments of the present disclosure.

Referring to FIGS. 4 and 5, the display device 100 according to embodiments of the present disclosure can include a display panel 200, a polarizing plate 210, a light path control cell 220, and a light path conversion film 230.

The light path control cell 220 can include a first substrate 420, a first electrode 421, a liquid crystal layer 423, a second electrode 422, and a second substrate 425.

The polarizing plate 210 can be disposed on the display panel 200.

The polarizing plate 210 can be a linear polarizing plate. For example, the polarizing plate 210 can include a polarizer, and an absorption axis of the polarizer can be in a 90° direction or a direction where a transmission axis is substantially perpendicular to the absorption axis, but the display device 100 according to embodiments of the present disclosure is not limited thereto.

The first substrate 420 can be disposed on the polarizing plate 210. The first electrode 421 can be disposed on the first substrate 420, and the liquid crystal layer 423 can be disposed on the first electrode 421. The second electrode 422 can be disposed on the liquid crystal layer 423, and the second substrate 425 can be disposed on the second electrode 422.

Each of the first and second substrates 420 and 425 can be a glass substrate or a transparent substrate including an organic insulating material, but the display device 100 according to embodiments of the present disclosure is not limited thereto.

The first and second electrodes 421 and 422 can be formed of a transparent conductive material. For example, the first electrode 421 and the second electrode 422 can be formed of at least one of indium tin oxide (ITO), aluminum doped zinc oxide (AZO), fluorine tin oxide (FTO), and silver-nanowire, but the present disclosure is not limited thereto. The first electrode 421 and the second electrode 422 can be made of the same material or different materials.

Referring to FIG. 5, the liquid crystal layer 423 can include a plurality of liquid crystals 523.

The arrangement of the liquid crystals 523 included in the liquid crystal layer 423 can vary depending on whether a voltage is applied to the first and second electrodes 421 and 422, so that it can be determined whether the display device 100 is in the shared mode or the shielding mode.

For example, the display device 100 can be in the shared mode when no voltage is applied to the first and second electrodes 421 and 422, and can be in the shielding mode when the voltage is applied thereto.

The display panel 200 can be electrically connected to at least one printed circuit, and the light path control cell 220 can be electrically connected to the printed circuit to which the display panel 200 is electrically connected.

The plurality of the liquid crystals 523 can be aligned in a predetermined direction.

A long axis of the liquid crystal layer 423 including the plurality of the liquid crystals 523 can be aligned in a direction at an angle of 45° with respect to the absorption axis of the polarizing plate 210.

Referring to FIG. 5, the light path conversion film 230 can include a film 530 and a plurality of molecules 531 including a polarization alignment dye included in the film 530. The plurality of the molecules 531 including the polarization alignment dye can be a dichroic dye, but the types of the plurality of the molecules 531 including the polarization alignment dye according to embodiments of the present disclosure are not limited thereto.

The plurality of the molecules 531 including a plurality of the polarization alignment dyes can have anisotropic light absorption characteristics depending on a slope with respect to the surface or a horizontal side of the polarizing plate 210. The plurality of the molecules 531 including the polarization alignment dye can be a material whose absorption rate of light varies depending on a polarization direction. For example, the absorption rate of light polarized in a long axis direction of the plurality of the molecules 531 including the polarization alignment dye can be high, and the absorption rate of light polarized in a short axis direction thereof can be low.

In other words, the transmittance of the polarized light vibrating in the short axis direction of the plurality of the molecules 531 including the polarization alignment dye can be higher than that of the polarized light vibrating in the long axis direction thereof.

For example, the plurality of the molecules 531 including the plurality of the polarization alignment dyes included in the light path conversion film 230 can be tilted at an angle of 50° to 80° with respect to the surface or the horizontal side of the polarizing plate 210 in cross-section.

Since the plurality of the molecules 531 including the plurality of the polarization alignment dyes can be tilted at the angle of 50° to 80° with respect to the surface of the polarizing plate 210, a viewer can view the plurality of the molecules 531 including the plurality of the polarization alignment dyes arranged in the short axis direction when a passenger looks at the display device 100 from the front, e.g., when the passenger looks at the display device from the seat.

Since the plurality of the molecules 531 including the plurality of the polarization alignment dyes can be tilted at the angle of 50° to 80° in cross-section, an absorption axis of the light path conversion film 230 can be in a direction substantially perpendicular to the absorption axis of the polarizing plate 210 (e.g., a direction of 0°) on the same plane.

In addition, the viewer can view the plurality of the molecules 531 including the plurality of the polarization alignment dyes arranged in the long axis direction when a driver looks at the display device 100 from the side, e.g., when the driver looks at the display device from the seat, compared to when looking at the display device from the front.

As mentioned above, the display device 100 according to embodiments of the present disclosure can operate in the shared mode when no voltage is applied to the first and second electrodes 421 and 422 of the light path control cell 220, and can operate in the shielding mode when the voltage is applied to the first and second electrodes 421 and 422 of the light path control cell 220. This can be reviewed in detail as below with reference to FIGS. 6 to 9.

Figure 6:
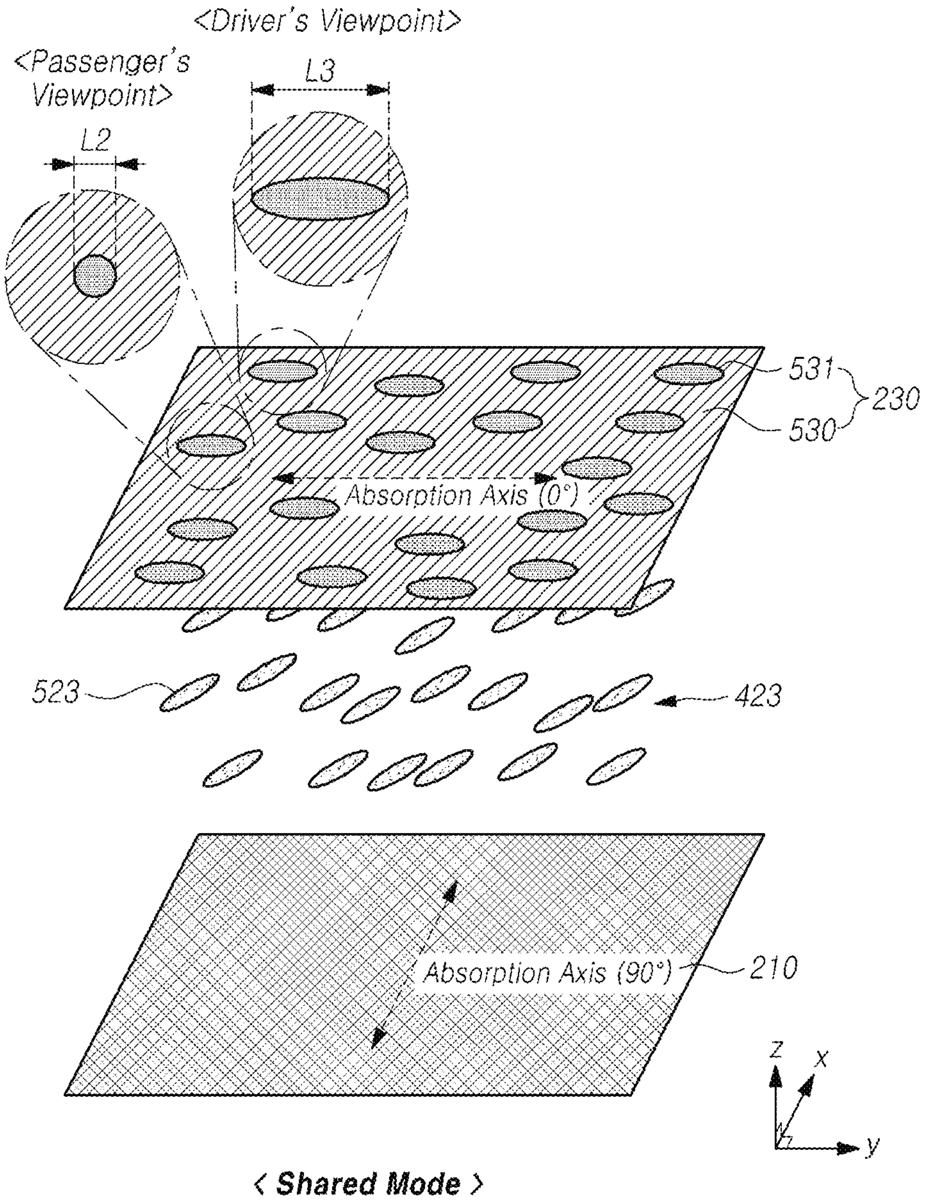
FIG. 6 is a view of a structure where a polarizing plate, a light path control cell, and a light path conversion film are in the shared mode based on a direction corresponding to a direction in which the polarizing plate is stacked under the light path control cell.
Figure 7:
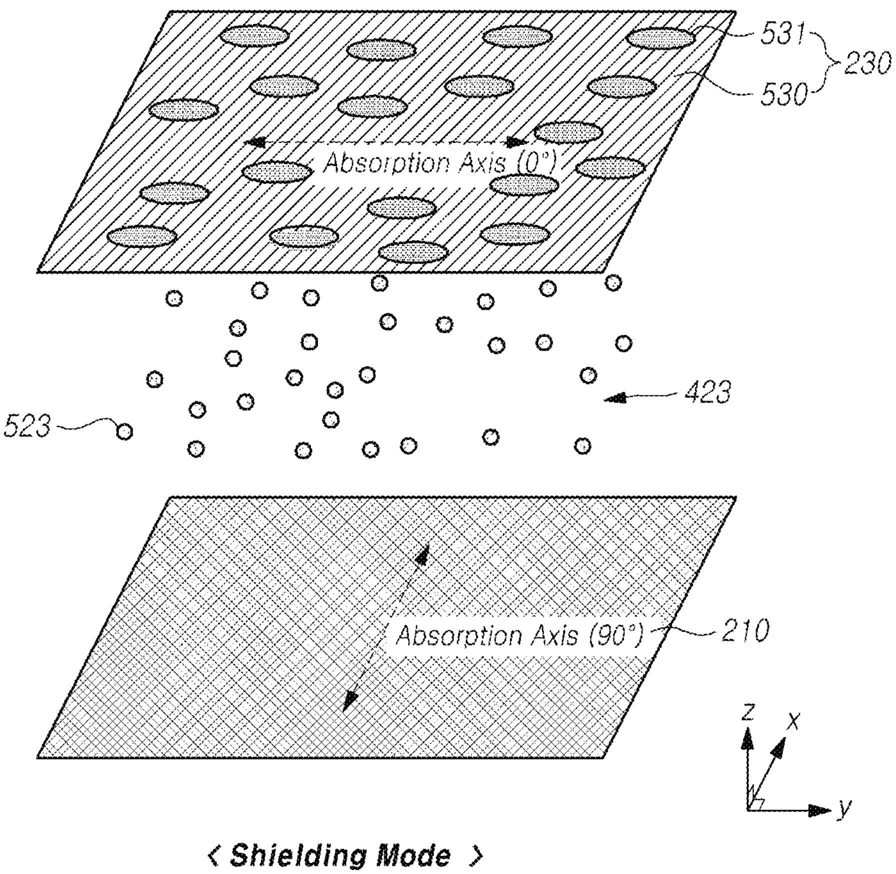
FIG. 7 is a view of a structure where the polarizing plate, the light path control cell, and the light path conversion film are in the shielding mode based on the direction corresponding to the direction in which the polarizing plate is stacked under the light path control cell.
Figure 8:
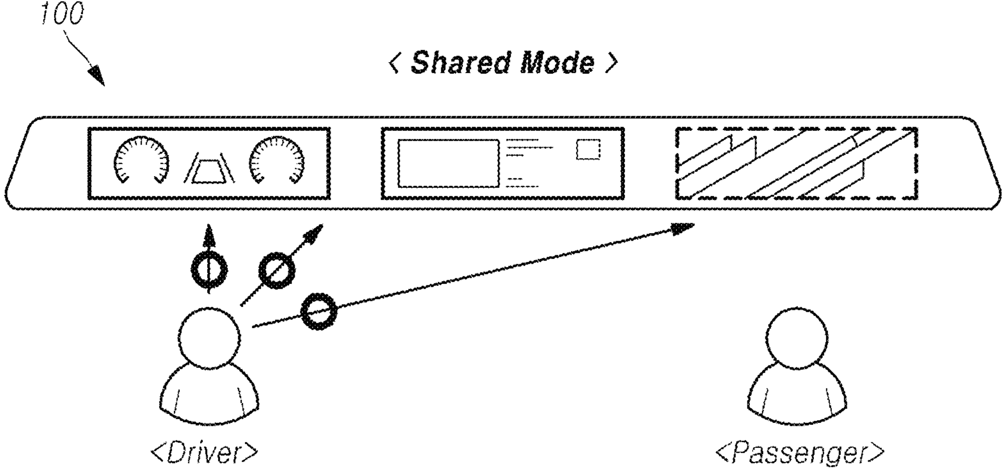
FIG. 8 is a view of a state in which a panel is viewed by a driver and a passenger when the display device according to embodiments of the present disclosure is in the shared mode.
Figure 9:
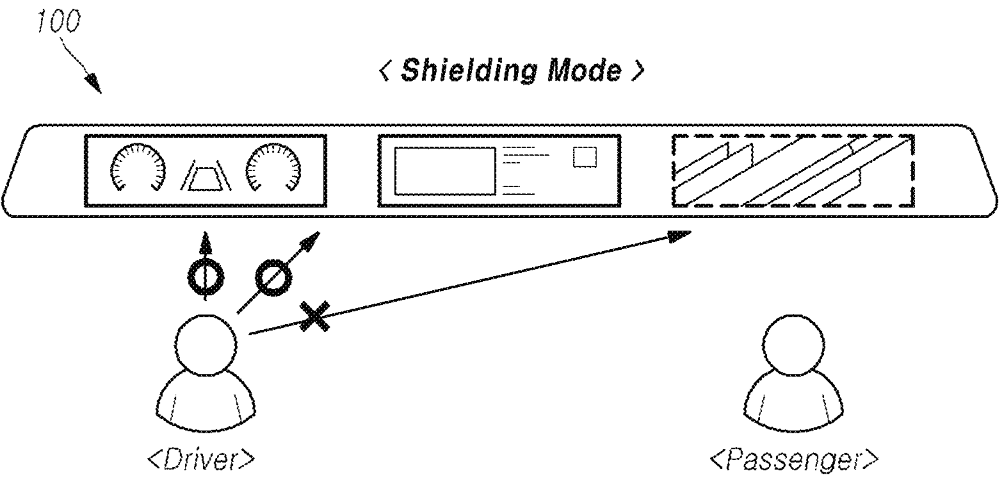
FIG. 9 is a view of a state in which the panel is viewed by the driver and the passenger when the display device according to embodiments of the present disclosure is in the shielding mode.

FIG. 6 is a view of a structure where a polarizing plate, a light path control cell, and a light path conversion film of a display device are in a shared mode based on a direction corresponding to a direction in which the polarizing plate is stacked under the light path control cell. FIG. 7 is a view of a structure where the polarizing plate, the light path control cell, and the light path conversion film are in a shielding mode based on the direction corresponding to the direction in which the polarizing plate is stacked under the light path control cell. FIG. 8 is a view of a state in which a panel is viewed by a driver and a passenger when a display device according to embodiments of the present disclosure is in the shared mode. FIG. 9 is a view of a state in which the panel is viewed by the driver and the passenger when the display device according to embodiments of the present disclosure is in the shielding mode.

FIGS. 6 and 7 can show a structure viewed when the display device is viewed from left and right as an example.

Referring to FIG. 6, among light supplied from the display panel, light in a direction (e.g., the y-axis direction in FIG. 6) substantially perpendicular to an absorption axis (e.g., a 90° direction or the x-axis direction in FIG. 6) of the polarizing plate 210 on the same plane can be transmitted.

A long axis of a liquid crystal layer 423 included in the light path control cell 220 disposed on the polarizing plate 210 can correspond to a 45° direction of the absorption axis of the polarizing plate 210.

Accordingly, light polarized by passing through the polarizing plate 210 can pass through the light path control cell 220.

When the display device 100 is in the shared mode, the liquid crystal layer 423 of the light path control cell 220 can have a birefringence value of $\lambda/2$ (the phase delay value is $\lambda/2$), and the light passing through the control cell 220 can change a polarization direction by a value of $2\varphi$. Here, $\varphi$ can be 45°, but it is not limited thereto.

Accordingly, the light polarized to an angle of 0° can reach the light path conversion film 230.

As mentioned above, a viewer can view a plurality of molecules 531 including a plurality of polarization alignment dyes arranged in a short axis direction when the passenger looks at the display device 100 from the front, when the passenger looks at the display device from the seat. Therefore, as shown in FIG. 6, a length L2 of the plurality of the molecules 531 including the plurality of the polarization alignment dyes viewed by the passenger can be shorter than a length L1 (see FIG. 5) of a long axis thereof.

Based on the front of the display device 100, the light reaching the light path conversion film 230 can be transmitted while being polarized along an absorption axis (e.g., a direction of 0° or the y-axis direction in FIG. 6) of the light path conversion film 230. Accordingly, light passing through the light path conversion film 230 can be emitted in a front direction of a display panel 200.

As mentioned above, since the plurality of the molecules 531 including the plurality of the polarization alignment dyes included in the light path conversion film 230 can be tilted at an angle of 50° to 80°, light polarized in a direction different from the absorption axis (e.g., the direction of 0° or the y-axis direction in FIG. 6) of the light path conversion film 230 can be incident. As a result, the light can be transmitted so that the screen of the display device 100 can be visible even to the driver.

As shown in FIG. 6, a length L3 of the plurality of the molecules 531 including the plurality of the polarization alignment dyes viewed by the driver can be shorter than the length L1 (see FIG. 5) of the long axis thereof, but can be longer than the length L2 thereof viewed by the passenger.

Accordingly, as shown in FIG. 6, it can be possible that an image is viewed from both the front and the side of the display device 100. In other words, when no voltage is applied to the light path control cell 220, the display device 100 can have a wide viewing angle.

Referring to FIG. 7, among the light supplied from the display panel, the light in the direction (e.g., the y-axis direction in FIG. 7) substantially perpendicular to the absorption axis (e.g., the 90° direction or the x-axis direction in FIG. 7) of the polarizing plate 210 can be transmitted.

The voltage can be applied to the light path control cell 220 to implement the shielding mode of the display device 100.

When the voltage is applied to the light path control cell 220, a plurality of liquid crystals 523 included in the light path control cell 220 can be arranged in a direction substantially perpendicular to the absorption axis of the polarizing plate 210.

Specifically, when the voltage is applied to the light path control cell 220, the plurality of the liquid crystals 523 can be tilted at an angle of 90° with respect to the surfaces of first and second substrates of the light path control cell 220.

The light path control cell 220 can transmit the polarized light through the polarizing plate 210 as it is. For example, an axis of the light passing through the light path control cell 220 can be substantially identical to an axis of the light polarized through the polarizing plate 210.

The light passing through the light path control cell 220 can reach the light path conversion film 230. The light reaching the light path conversion film 230 can have an absorption axis in a direction substantially perpendicular to an absorption axis of the light path conversion film 230 (e.g., the direction of 0° or the y-axis direction in FIG. 7).

Meanwhile, since the plurality of the molecules 531 including the plurality of the polarization alignment dyes can be tilted at the angle of 50° to 80°, when the passenger looks at the display device 100 in the shielding mode from the front, e.g., when the passenger looks at the display device from the seat, the viewer can view the plurality of the molecules 531 including the plurality of the polarization alignment dyes arranged in the short axis direction.

The plurality of the molecules 531 including the plurality of the polarization alignment dyes can absorb a small amount of light in the short axis direction. Therefore, as shown in FIG. 8, it can be possible to view the screen when looking at the display device 100 from the front.

However, luminance can be lower than that of the display device 100 in the shared mode. In this case, the luminance can be compensated by improving luminance of the display panel.

When the display device 100 is viewed from the side (e.g., in the case that the driver looks at the display device from the driver's seat), light having an axis substantially perpendicular to the absorption axis (e.g., the direction of 0° or the y-axis direction in FIG. 7) of the light path conversion film 230 can arrive. For example, light can be absorbed by the light path conversion film 230 in a lateral direction of the display device 100.

Accordingly, as shown in FIG. 9, when the display device 100 in the shielding mode is viewed from the side, the image may not be viewed.

The display device 100 in the shielding mode can have a narrow viewing angle.

As such, since the plurality of the molecules 531 including the plurality of the polarization alignment dyes included in the light path conversion film 230 can be tilted at the angle of 50° to 80° in cross-section, it can be possible that the display device 100 is be viewed in both the shared and the shielding mode at a position where it is viewed from the front.

In the shared mode, light arriving on the light path conversion film 230 from the light path control cell 220 can be incident in a direction other than a direction where its axis is substantially perpendicular to the absorption axis of the light path conversion film 230, so that it can be possible to view the image from the front of the display device 100.

In contrast, in the shielding mode, the light arriving on the light path conversion film 230 from the light path control cell 220 can be incident in a direction where its axis is substantially perpendicular to the absorption axis of the light path conversion film 230. However, from the front of the display device 100, the plurality of the molecules 531 including the plurality of the polarization alignment dyes included in the light path conversion film 230 can be viewed in the short axis direction, so light absorption can decrease in the front direction of the display device 100.

Therefore, it can be possible to view the image from the front of the display device 100 even in the shielding mode.

As described above, it can be possible to simply determine whether the display device 100 is in the shared mode or in the shielding mode only by whether the voltage is applied to the light path control cell 220.

Examples of the viewing angle characteristics of a shared mode and a shielding mode of a display device according to embodiments of the present disclosure will be reviewed as below with reference to FIG. 10.

Figure 10:
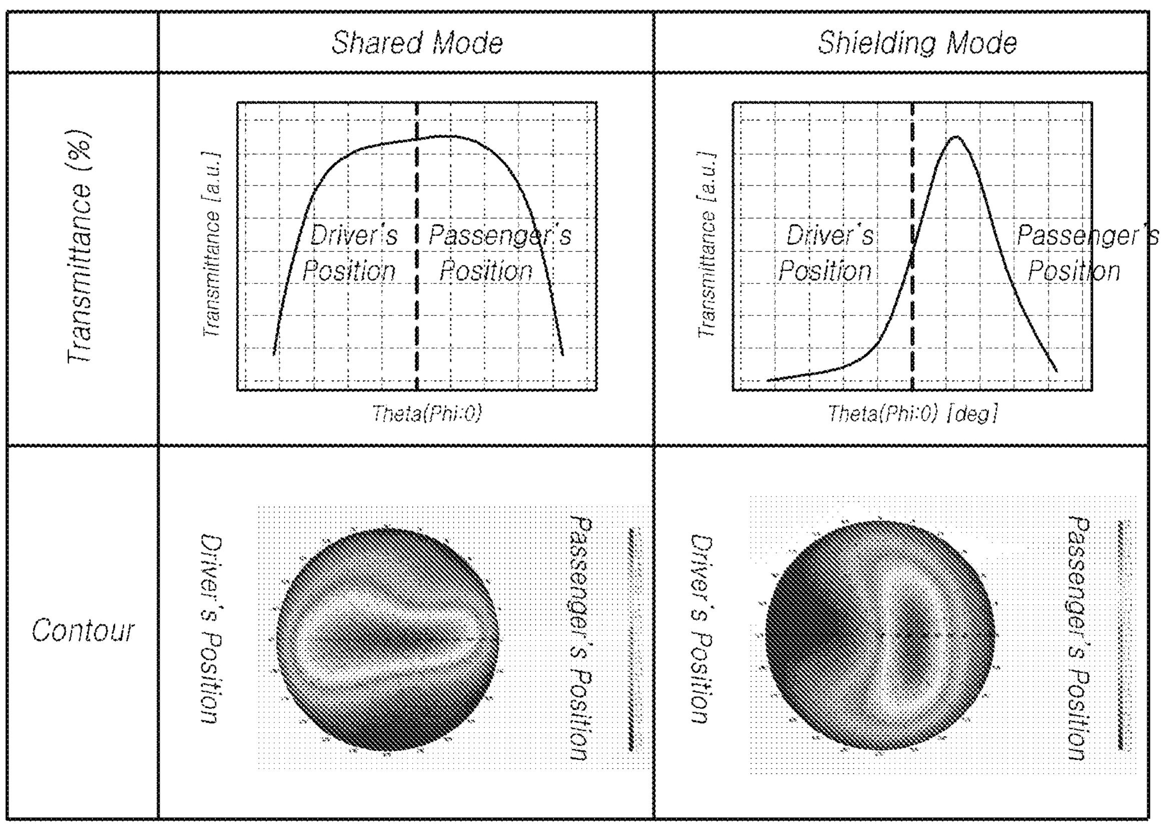
FIG. 10 is a view illustrating viewing angle characteristics of the shared mode and the shielding mode of the display device according to embodiments of the present disclosure.

FIG. 10 is a view illustrating the viewing angle characteristics of the shared mode and the shielding mode of the display device according to embodiments of the present disclosure.

For instance, FIG. 10 shows light transmittance and luminance characteristics of a display panel at each position when the display panel of the display device located in front of a passenger is viewed at a driver's position or the passenger's position. FIG. 10 shows that the light transmittance and the luminance of the display panel can be high at the driver's position or the passenger's position when the display device according to embodiments of the present disclosure is in the shared mode.

Referring to FIG. 10, when the display device according to the embodiments of the present disclosure is in the sharing mode, it can be seen that the light transmittance and luminance of the display panel are high at the driver's position or the passenger's position, respectively.

In other words, when the display device is in the shared mode, it can be possible that the display panel located in front of the passenger is viewed not only by the passenger but also by the driver.

For example, it is seen that a viewing angle of the display device can be wide left and right in the shared mode.

It is seen that, when the display device according to embodiments of the present disclosure is in the shielding mode, the light transmittance and the luminance of the display panel can be high at the passenger's position, but can be very low at the driver's position.

In other words, it is seen that the display panel located in front of the passenger can be visible only to the passenger and not to the driver when the display device is in the shielding mode.

Furthermore, FIG. 10 shows that the luminance of the display panel can be high from a high position to a low position with respect to the passenger's position when the display device according to embodiments of the present disclosure is in the shielding mode. Accordingly, it can be possible to view a clear image of the display panel regardless of whether the seated height of the passenger is tall or short.

As such, it is seen that, when the display device is in the shielding mode, a left and right viewing angle of the display device can be narrow, but a vertical viewing angle at the passenger's position can be wide.

Figure 11:
FIG. 11 is a view illustrating examples of luminance characteristics that are determined according to how much long axes of a plurality of molecules including a plurality of polarization alignment dyes included in the light path conversion film are tilted with respect to the surface of the polarizing plate when the display device according to embodiments of the present disclosure is in the shared mode or the shielding mode.

With reference to FIG. 11, luminance characteristics can be determined according to how much long axes of a plurality of molecules 531 including a plurality of polarization alignment dyes included in a light path conversion film 230 are tilted with respect to the surface of the polarizing plate 210 when the display device 100 according to embodiments of the present disclosure is in a shared mode or a shielding mode.

FIG. 11 is a view illustrating examples of the luminance characteristics that are determined according to how much the long axes of the plurality of the molecules 531 including the plurality of the polarization alignment dyes included in the light path conversion film 230 are tilted with respect to the surface of the polarizing plate 210 when the display device according to embodiments of the present disclosure is in the shared mode or the shielding mode.

Referring to FIG. 11, when the long axes of the plurality of the molecules 531 including the plurality of the polarization alignment dyes included in the light path conversion film 230 are tilted at an angle of 45° with respect to the surface of the polarizing plate 210, luminance of a display panel can be high at a driver's position or a passenger's position when the display device is in the shared mode. For example, it can be possible that a left and right viewing angle is sufficiently secured when the display device is in the shared mode.

In contrast, when the long axes of the plurality of the molecules 531 including the plurality of the polarization alignment dyes are tilted at the angle of 45° with respect to the surface of the polarizing plate 210, the luminance of the display panel can be very low at the driver's position and even in front of the passenger when the display device is in the shielding mode. However, the luminance of the display panel can be high in a direction skewed to the right of the passenger or in the side of the passenger. For example, when the display device is in the shielding mode, an image of the display panel may not be visible to the driver. However, the front of the display panel may not be visible even to the passenger while the side thereof can be visible thereto.

Referring to FIG. 11, when the long axes of the plurality of the molecules 531 including the plurality of the polarization alignment dyes included in the light path conversion film 230 are tilted at an angle of 75° with respect to the surface of the polarizing plate 210, the luminance of the display panel can be high at the driver's position or at the passenger's position when the display device is in the shared mode. For example, it can be possible that the left and right viewing angle is sufficiently secured when the display device is in the shared mode.

In addition, when the long axes of the plurality of the molecules 531 including the plurality of the polarization alignment dyes are tilted at an angle of 75° with respect to the surface of the polarizing plate 210, the luminance of the display panel can be very low at the driver's position, and can be high at the passenger's position. For example, when the display device is in the shielding mode, the image of the display panel may not be visible to the driver, but can be visible to the passenger.

Referring to FIG. 11, when the long axes of the plurality of the molecules 531 including the plurality of the polarization alignment dyes included in the light path conversion film 230 are tilted at an angle of 90° with respect to the surface of the polarizing plate 210, the luminance of the display panel can be high at the driver's position or at the passenger's position when the display device is in the shared mode.

For example, it can be possible that the left and right viewing angle is sufficiently secured when the display device is in the shared mode.

Furthermore, when the long axes of the plurality of the molecules 531 including the plurality of the polarization alignment dyes are tilted at the angle of 90° with respect to the surface of the polarizing plate 210, the luminance of the display panel can high in front of both the driver and the passenger.

For example, it can be possible that the image of the display panel is visible to the driver and the passenger when the display device is in the shielding mode.

In other words, the characteristics of the shielding mode can vary depending on the slope of the long axes of the plurality of the molecules 531 including the plurality of the polarization alignment dyes.

The plurality of the molecules 531 including the plurality of the polarization alignment dyes included in the light path conversion film 230 of the display device 100 according to embodiments of the present disclosure can be tilted at an angle of 50° to 80° with respect to the surface of the polarizing plate 210. Therefore, when the display device is in the shielding mode, even if the driver looks at the display panel of the display device located in front of the passenger, the image of the display device may not be visible while it can be possible for the passenger to view the image from the front.

However, when the plurality of the molecules 531 including the plurality of the polarization alignment dyes are tilted at an angle of less than 50° with respect to the surface of the polarizing plate 210, the image of the display panel may not be visible not only to the driver but also to the passenger in front of the display panel when the display device is in the shielding mode.

In addition, when the plurality of the molecules 531 including the plurality of the polarization alignment dyes are tilted at an angle of more than 80° with respect to the surface of the polarizing plate 210, the image of the display panel can be viewed from the front of both the driver and the passenger when the display device is in the shielding mode.

The embodiments of the present disclosure above can be briefly described as below according to examples.

In one example, the display device 100 according to embodiments of the present disclosure can include the polarizing plate 210 disposed on the display panel 200, the light path control cell 220 disposed on the polarizing plate 210 and including the liquid crystal layer 423, and the light path conversion film 230 disposed on the light path control cell 220 and including the plurality of the molecules 531 including the plurality of the polarization alignment dyes, wherein the absorption axis of the polarizing plate 210 is substantially perpendicular to the absorption axis of the light path conversion film 230, and the display device 100 can switch to a shared mode or a shielding mode depending on whether or not a voltage is applied to the light path control cell 220.

The display panel 200 can be connected to at least one printed circuit, and the light path conversion cell 220 can be electrically connected to the printed circuit.

The plurality of molecules 531 including the plurality of the polarization alignment dyes can be tilted with respect to the surface of the polarizing plate 210.

The plurality of molecules 531 including the plurality of the polarization alignment dyes can be tilted at the angle of 50° to 80° with respect to the surface of the polarizing plate 210.

Each of the plurality of the molecules 531 including the plurality of the polarization alignment dyes can have the long axis and the short axis, and the transmittance of the light incident in the long axis direction can be lower than that of the light incident in the short axis direction.

When the voltage is applied to the light path control cell 220, the liquid crystal layer 423 can have the birefringence value of $\lambda/2$.

When the voltage is applied to the light path control cell 220, the plurality of the liquid crystals 523 can be tilted at the angle of 90° with respect to the surfaces of the first and second substrates. The axis of the light passing through the light path control cell 220 can be substantially perpendicular to the absorption axis of the light path conversion film 230, and can correspond to the absorption axis of the polarizing plate 210.

As described above, according to embodiments of the present disclosure, there can be provided a display device for switching the viewing angle that can switch to a shared mode or a shielding mode depending on whether or not a voltage is applied to the light path control cell.

The description above has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the present disclosure. The description above and the accompanying drawings provide an example of the technical idea of the present disclosure for illustrative purposes only. For example, the disclosed embodiments are intended to illustrate the scope of the technical idea of the present disclosure.

Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the present disclosure.

What is claimed is:

1. A display device for vehicles and positioned therein in a direction in which a passenger looks at the display device from a front, the display device comprising:

a display panel;

a linear polarizing plate extending in an x-y plane and disposed on the display panel;

a light path control cell disposed on the linear polarizing plate and comprising a liquid crystal layer; and a light path conversion film disposed on the light path control cell and comprising a plurality of molecules comprising a polarization alignment dye, wherein an absorption axis in the x-y plane of the linear polarizing plate is perpendicular to an absorption axis in an x-y plane of the light path conversion film, the absorption axis of the linear polarizing plate is 90° in the x-y plane of the linear polarizing plate and extends in an X-axis direction, and the absorption axis of the light path conversion film is 0° in the x-y plane of the light path conversion film and extends in a Y-axis direction, wherein the display device switches to a shared mode or a shielding mode depending only on whether or not a voltage is applied to the light path control cell, wherein the linear polarizing plate has a plate shape extending in the X-axis direction and the Y-axis direction, and the plurality of molecules comprising the polarization alignment dye are aligned in a Z-axis direction, wherein the plurality of molecules comprising the polarization alignment dye are tilted at an angle of 50° to 80° in cross-section with respect to a surface of the linear polarizing plate to transmit light polarized in a direction different from the absorption axis of the light path conversion film and have anisotropic light absorption characteristics depending on a slope with respect to the surface of the linear polarizing plate in order that an absorption rate of light polarized in a long axis direction of the plurality of molecules is higher than an absorption rate of light polarized in a short axis direction of the plurality of molecules, and a tilt of the plurality of molecules comprising the polarization alignment dye excludes any angle of less than 50° and any angle of more than 80°, wherein the light path control cell comprises a first substrate, a first electrode disposed on the first substrate, the liquid crystal layer disposed on the first electrode and comprising a plurality of liquid crystals, a second electrode disposed on the liquid crystal layer, and a second substrate disposed on the second electrode, and a liquid crystal mode of the light path control cell being an electrically controlled birefringence mode, wherein the liquid crystal layer has a birefringence value of 2/2 when no voltage is applied to the light path control cell, wherein a long axis of the liquid crystal layer including the plurality of liquid crystals is aligned in a direction at an angle of 45° with respect to the absorption axis in the x-y plane of the linear polarizing plate in the shared mode when the voltage is not applied to the light path control cell, wherein the plurality of liquid crystals are tilted at an angle of about 90° with respect to surfaces of the first and second substrates in the shielding mode when the voltage is applied to the light path control cell, wherein the display device for switching a viewing angle is in the shared mode in response to no voltage being applied to the light path control cell and in the shielding mode in response to the voltage being applied to the light path control cell, wherein when the display device is in the shared mode:

a length of the plurality of molecules when viewed from the front is shorter than a length of the plurality of molecules when viewed from a side; and the length of the plurality of molecules when viewed from the side is shorter than a length of a long axis of the plurality of molecules, wherein the liquid crystal layer directly contacts the first electrode and the second electrode, wherein the plurality of molecules are tilted at the angle of 50° to 80° such that the passenger viewing the display panel from a seat perceives light transmitted through a short axis of the plurality of molecules, wherein a data driver is implemented as a plurality of source driver integrated circuits mounted on a source-side circuit film electrically connected to a pad portion in a non-active area of the display panel, and wherein a power management integrated circuit is configured to increase a luminance of the display panel in the shielding mode to compensate for light absorption by the light path conversion film.

2. The display device of claim 1, wherein a polarization direction of light passing through the light path control cell is not corresponding to the absorption axis in the x-y plane of the light path conversion film when no voltage is applied to the light path control cell.

3. The display device of claim 1, wherein a polarization direction of light passing through the light path control cell corresponds to the absorption axis of the light path conversion film and is perpendicular to the absorption axis in the x-y plane of the linear polarizing plate when the voltage is applied to the light path control cell.

4. The display device of claim 1, wherein the display device is viewed from the front and a side when the display device is in the shared mode, and the display device is viewed from the front when the display device is in the shielding mode.

5. The display device of claim 1, wherein the plurality of molecules comprising the polarization alignment dye are tilted at an angle of about 75° in cross-section with respect to the surface of the linear polarizing plate.

6. The display device of claim 1, wherein the tilt of less than about 50° renders the display panel invisible to the passenger.

7. A display device for vehicles and positioned therein in a direction in which a passenger looks at the display device from a front, the display device comprising:

a display panel connected to at least one printed circuit, the at least one printed circuit comprising a data driver being implemented in a chip on film type and a gate driver being implemented in a gate in panel type;

a linear polarizing plate extending in an x-y plane and disposed on the display panel;

a light path control cell disposed on the linear polarizing plate, electrically connected to the at least one printed circuit, and comprising a liquid crystal layer; and a light path conversion film disposed on the light path control cell and comprising a plurality of molecules comprising a polarization alignment dye, wherein an absorption axis in the x-y plane of the linear polarizing plate is disposed in an X-axis direction, an absorption axis in an x-y plane of the light path conversion film is disposed in a Y-axis direction, the absorption axis of the linear polarizing plate is perpendicular to the absorption axis of the light path conversion film, the absorption axis of the linear polarizing plate is 90° in the x-y plane of the linear polarizing plate and extends in the X-axis direction, and the absorption axis of the light path conversion film is 0° in the x-y plane of the light path conversion film and extends in the Y-axis direction, wherein the display device switches to a shared mode or a shielding mode depending only on whether or not a voltage is applied to the light path control cell, wherein the linear polarizing plate has a plate shape extending in the X-axis direction and the Y-axis direction, and the plurality of molecules comprising the polarization alignment dye are aligned in a Z-axis direction, wherein the plurality of molecules comprising the polarization alignment dye are tilted at an angle of 50° to 80° in cross-section with respect to a surface of the linear polarizing plate to transmit light polarized in a direction different from the absorption axis of the light path conversion film and have anisotropic light absorption characteristics depending on a slope with respect to the surface of the linear polarizing plate in order that an absorption rate of light polarized in a long axis direction of the plurality of molecules is higher than an absorption rate of light polarized in a short axis direction of the plurality of molecules, and a tilt of the plurality of molecules comprising the polarization alignment dye excludes any angle of less than 50° and any angle of more than 80°, wherein the light path control cell comprises a first substrate, a first electrode disposed on the first substrate, the liquid crystal layer disposed on the first electrode and comprising a plurality of liquid crystals, a second electrode disposed on the liquid crystal layer, and a second substrate disposed on the second electrode, and a liquid crystal mode of the light path control cell being an electrically controlled birefringence mode, wherein the liquid crystal layer has a birefringence value of 2/2 when no voltage is applied to the light path control cell, wherein a long axis of the liquid crystal layer including the plurality of liquid crystals is aligned in a direction at an angle of 45° with respect to the absorption axis in the x-y plane of the linear polarizing plate in the shared mode when the voltage is not applied to the light path control cell, wherein the plurality of liquid crystals are tilted at an angle of 90° with respect to surfaces of the first and second substrates in the shielding mode when a voltage is applied to the light path control cell, wherein the display device for switching a viewing angle is in the shared mode in response to no voltage being applied to the light path control cell and in the shielding mode in response to the voltage being applied to the light path control cell, wherein when the display device is in the shared mode:

a length of the plurality of molecules when viewed from the front is shorter than a length of the plurality of molecules when viewed from a side; and the length of the plurality of molecules when viewed from the side is shorter than a length of a long axis of the plurality of molecules, wherein the liquid crystal layer directly contacts the first electrode and the second electrode, wherein the plurality of molecules are tilted at the angle of 50° to 80° such that the passenger viewing the display panel from a seat perceives light transmitted through a short axis of the plurality of molecules, wherein a data driver is implemented as a plurality of source driver integrated circuits mounted on a source-side circuit film electrically connected to a pad portion in a non-active area of the display panel, and wherein a power management integrated circuit is configured to increase a luminance of the display panel in the shielding mode to compensate for light absorption by the light path conversion film.

8. The display device of claim 7, wherein the tilt of less than about 50° renders the display panel invisible to the passenger.

* * * * *